United States Patent [19]

Suzuki et al.

[11] 4,232,518
[45] Nov. 11, 1980

[54] SEALED TYPE FLUID RESERVOIR

[75] Inventors: Mitsuyuki Suzuki, Okazaki; Atsushi Ohmi, Anjo, both of Japan

[73] Assignee: Aisin Seiki Kabushiki Kaisha, Kariya, Japan

[21] Appl. No.: 962,660

[22] Filed: Nov. 21, 1978

[30] Foreign Application Priority Data

Nov. 30, 1977 [JP] Japan .................................. 52-143724

[51] Int. Cl.³ .............................................. F15B 7/00
[52] U.S. Cl. ........................................ 60/535; 60/545; 60/592; 137/845
[58] Field of Search ................ 60/534, 535, 592, 545; 137/845

[56] References Cited

U.S. PATENT DOCUMENTS

| 3,159,175 | 12/1964 | MacMillan | 137/845 |
| 3,423,939 | 1/1969 | Lewis | 60/592 |
| 3,969,898 | 7/1976 | Fulmer | 60/592 |
| 4,136,712 | 1/1979 | Nogami | 60/535 |

FOREIGN PATENT DOCUMENTS

| 2339279 | 2/1974 | Fed. Rep. of Germany | 60/535 |
| 2502746 | 8/1975 | Fed. Rep. of Germany | 60/535 |
| 2555867 | 7/1976 | Fed. Rep. of Germany | 60/535 |
| 2636607 | 2/1977 | Fed. Rep. of Germany | 60/534 |

*Primary Examiner*—Abraham Hershkovitz
*Attorney, Agent, or Firm*—Oblon, Fisher, Spivak, McClelland & Maier

[57] ABSTRACT

A sealed type fluid reservoir in which a valve member is incorporated in a main cap which is coupled with an upper end of a casing. The pressure in the interior of the casing is maintained at atmospheric level by the valve member despite pressure variation in the interior of the casing.

2 Claims, 3 Drawing Figures

4,232,518

SEALED TYPE FLUID RESERVOIR

BACKGROUND OF THE INVENTION

1. Field of the Invention

This invention relates to a sealed type fluid reservoir, and more particularly to a sealed type fluid reservoir having a valve member provided in a main cap of a casing and by which pressure in the interior of the casing is maintained at atmospheric level.

2. Description of the Prior Art

The pressure in the interior of the casing of the brake master cylinder, for instance, varies and becomes positive or negative in comparison with atmospheric level due to the variation of ambient temperature or quantity of brake fluid. In order to maintain the pressure in the interior of the casing at atmospheric level, there has been provided a sealed type reservoir with a pair of check valves, both of which are disposed to operate in opposite directions.

The typical check valve of the conventional sealed type fluid reservoir, for example as disclosed in U.S. patent application, Ser. No. 712,862, filed Aug. 9, 1976, comprises a radially outwardly extended flange or rod element secured to the main cap, a first lip member air-tightly engaged with one face of the flange and a second lip member air-tightly engaged with the other face of the flange. The lip is at least formed integrally with the main cap which is deformable due to pressure variation in the interior of the casing. Consequently, sealing pressure between the flange and the lip integrally formed with the main cap is changed. In order to open the check valve at a predetermined pressure of the interior of the casing, the quality of the main cap and the condition of the interference of the lip have to be taken into consideration in the design thereof.

Further it is difficult to air-tightly engage the lip with the flange in light of manufacturing errors. For this reason, it is difficult to design and manufacture such check valves.

SUMMARY OF THE INVENTION

It is therefore an object of this invention to provide a sealed type fluid reservoir in which a valve member is incorporated in a main cap.

It is another object of this invention to provide a sealed type fluid reservoir which will overcome conventional drawbacks.

It is a further object of this invention to provide a sealed type fluid reservoir which is simple in construction and low in manufacturing cost.

The present invention has a simple construction in which the valve member is provided at the boss of the main cap by sliting the thin portion of the boss so that the pressure in the interior of the casing may be maintained at atmospheric level though the pressure in the interior of the casing becomes positive or negative in comparison with atmospheric level.

In addition, despite deformation of the main cap due to the pressure variation in the interior of the casing, the opening and closing function of the slit of the valve member is not affected by the deformation of the main cap. Thus, stable pressure control in the interior of the casing is possible.

Further, the valve member is incorporated in the main cap, so as to easily construct the main cap and assemble the main cap to the casing so that the cost of assembly may be reduced.

BRIEF DESCRIPTION OF THE DRAWINGS

Various other objects, features and attendant advantages of the present invention will be more fully appreciated as the same become better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
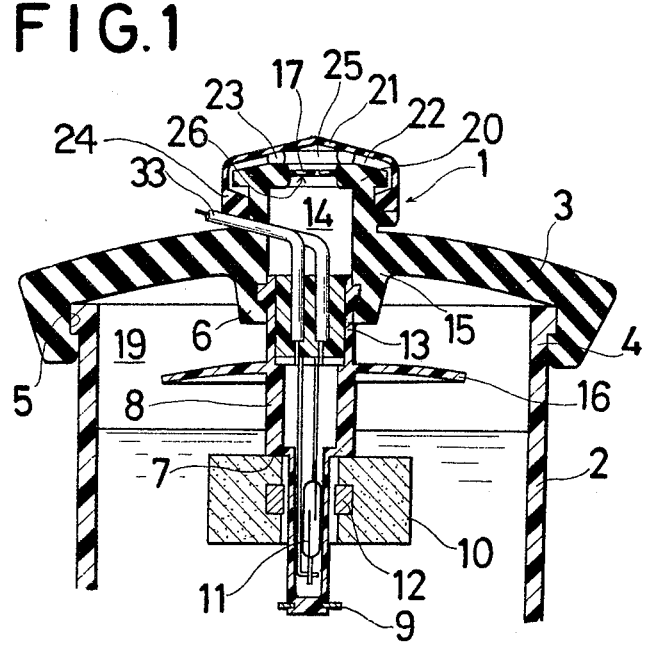
FIG. 1 is a partial cross-sectional view of a sealed type master cylinder which incorporates a valve member in accordance with the present invention.
Figure 2:
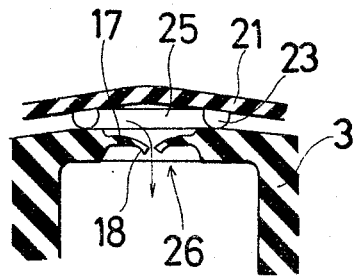
FIG. 2 is an enlarged partial cross-sectional view of the valve member of FIG. 1.
Figure 3:
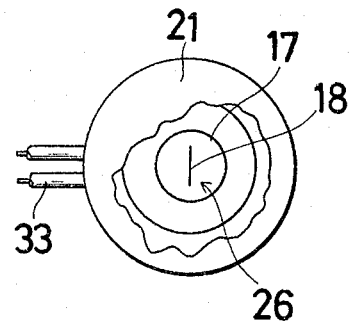
FIG. 3 is a fragmentary plan view of the valve member of FIG. 2.

Referring now to FIGS. 1 through 3, a reservoir casing 2 of a sealed type reservoir 1 is fixedly mounted on a brake master cylinder (not shown) to constantly store brake fluid therein as a supply for the master cylinder. The casing 2 is made of transparent plastic thereby permitting observation of the level of the fluid stored therein.

An upper opening of the casing 2 is fluid-tightly closed by a main cap 3 which is made of synthetic rubber. In other words, an annular flange 4 is provided radially outwardly of the opening of the casing 2 to be fluid-tightly coupled with an inner circumferential groove 5 of the main cap 3 by utilizing the elasticity of the main cap 3. The main cap 3 is provided with an annular boss 6 made integrally therewith at the central portion thereof and extending in the vertical direction.

Within the interior 19 of the casing 2, a magnetically operabel switch member is disposed including a rod element 8 secured to the boss 6 and extended downwardly through a floating member 10, The rod element 8 is provided therein with a normally open reed switch 11 which cooperates with a ring-shaped permanent magnet 12 carried at the inner surface of the floating member 10. The reed switch 11 is electrically connected to an electric alarming device (not shown) by way of lead wires 33 to ensure an alarm upon occurence of a danagerous decrease in the quantity of the brake fluid.

The floating member 10 floats on the surface of the brake fluid for vertical movement in response to variation of the brake fluid along the rod element 8. Upward movement of the floating member 10 is restricted by a stepped portion 7 of the rod element 8 while downward movement thereof is restricted by a stopper 9 fixed to the lowest end of the rod element 8. Thus, the floating member 10 is in contact with the stepped portion 7 of the rod element 8 when brake fluid is adequately stored in the casing 2 and moves downward in accordance with lowering of the level of the brake fluid.

When the level of brake fluid drops below a minimum set limit, the reed switch 11 is closed by magnetic force of the permanent magnet 12 of the floating member 10 to actuate the alarming device so as to warn of shortage of the brake fluid to the driver. In the boss 6 of the main cap 3 there is provided a chamber 14 defined by the inner wall of the boss 6, the rod element 8 and a plug 13 of the rod element 8. Chamber 14 communicates with the interior 19 of the casing 2 through a vent hole 15 of the main cap 3.

The rod element 8 is formed with a flange 16 extending radially outwardly, thereby preventing brake fluid from scattering to the main cap 3. The strainer, although not illustrated, may be provided in the casing 2 in a conventional manner.

At the end of an upper portion 20 of the boss 6, a thin portion 17 is formed integrally with the boss 6. The thin portion 17 is cut radially to form a slit 18 as seen in FIG. 3, thereby forming a normally closed valve member 26. By adjusting the length of the slit 18 and the thickness of the thin portion 17, the valve member 26 may permit and control flow of air from an air passage 22 to the interior 19 of the casing 2 and vice versa by way of vent hole 15 when the differential pressure therebetween exceeds the set limit.

A secondary cap 21 provided with a plurality of projections 23 arranged circularly at the inner surface thereof is loosely coupled with the upper portion 20 of the boss 6 so that the air-passage 22 and a compartment 25 are formed therebetween. The air-passage 22 is in communication with atmospheric air through a groove 24 which is formed in the secondary cap 21 by recessing the periphery thereof. Thus, the compartment 25, communicated with atmospheric air and the chamber 14 connected to the interior 19 of the casing, are opposed to each other relative to the valve member 26. Thus, the slit 18 is easily opened when the differential pressure is generated between the compartment 25 and the chamber 14.

In use of the sealed fluid reservoir having the above-mentioned construction, when the level of the brake fluid is maintained at the set limit or the interior 19 of the casing 2 is not affected by ambient temperature, the pressure in the interior 19 of the casing 2 maintains atmospheric level. Consequently, no difference in pressure between the chamber 14 and compartment 25 is generated and the slit 18 is fluid-tightly closed thereby preventing entrance of water or moisture into the brake fluid.

When the level of the brake fluid is raised due to inflation of the brake fluid caused by raising the ambient temperature, the air in the interior 19 of the casing 2 is compressed and exceeds atmospheric level. The thin portion 17 is then flexed upwardly and the slit 18 is opened to permit flow of the compressed air to the compartment 25 and the pressure in the interior 19 is decreased to the atmospheric level. Thereafter, the thin portion 17 of the boss 6 is immediately flexed to the original position and the slit 18 is closed.

When the level of the brake fluid drops due to shrinkage of the brake fluid caused by decrease of ambient temperature or decrease of the brake fluid caused by abrasion of the brake linings, the interior 19 of the casing 2 becomes negative in pressure. The differential pressure between chamber 14 and compartment 25 is thus generated and the slit 18 is opened as seen in FIG. 2. This permits flow of atmospheric air into the interior 19 of the casing 2 and the pressure in the interior 19 of the casing 2 increases to atmospheric level. Thereafter, the slit 18 is immediately closed.

In case the level of the brake fluid drops below a minimum set limit by leakage of the brake fluid, the floating member 10 moves down along the rod element 8 in accordance with the brake fluid and the reed switch 11 is operated by magnetic force of the permanent magnet 12 to activate the electric alarming device so as to indicate a shortage of brake fluid to the operator.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States of America is:

1. A sealed type fluid reservoir mounted on a brake master cylinder comprising:
   a casing which comprises transparent plastic material;
   a main cap which comprises a rubber material disposed on the casing and which includes an upper portion extending therefrom having a comparatively thin portion, said thin portion of said upper portion of the cap including a slit formed therein;
   a secondary cap mounted on the main cap;
   a plurality of projections formed on the secondary cap;
   air passage means formed between the secondary cap and said main cap by said projection;
   groove means formed on said secondary cap for communicating said air passage means to atmospheric air, said casing including a brake fluid containing interior; and
   a chamber formed between said thin portion and said main cap in open communication with the casing interior, said slit of said thin portion comprising a radial slit such that said thin portion comprises a normally closed valve member for controlling flow of air from said air passage means to said casing interior and vice versa when differential pressure therebetween exceeds a set limit.

2. A sealed type fluid reservoir as claimed in claim 1 which further comprises:
   an electric alarming device;
   a rod element connected to said main cap;
   a floating member provided with a permanent magnet at the inner surface thereof and arranged around said rod element so as to be moved vertically along said rod element in accordance with the level of the brake fluid; and
   a reed switch disposed in said rod element to activate the electric device when the level of brake fluid drops below a predetermined level.

* * * * *